United States Patent
Ueki et al.

[11] Patent Number: 5,874,122
[45] Date of Patent: Feb. 23, 1999

[54] STEAMED WHEAT FLOUR FOR FRY-COOKING WHICH IS SUITABLE FOR USE IN REHEATING IN A MICROWAVE OVEN AND PRODUCTION PROCESS THEREOF

[75] Inventors: Yoshihito Ueki, Tokyo; Hirofumi Motoi; Hideyuki Miyamura, both of Saitama; Hirofumi Sori, Tokyo; Futoshi Hirasawa, Saitama, all of Japan

[73] Assignee: Nisshin Flour Milling Co., Ltd., Tokyo, Japan

[21] Appl. No.: 783,896

[22] Filed: Jan. 16, 1997

[30] Foreign Application Priority Data

Jan. 18, 1996 [JP] Japan ..................... 8-006522

[51] Int. Cl.$^6$ ........................................ A21D 2/00
[52] U.S. Cl. ..................... 426/622; 426/463; 426/615
[58] Field of Search .................... 426/622, 463, 426/615

[56] References Cited

FOREIGN PATENT DOCUMENTS 04-11857  4/1992  Japan.
8-84568   4/1996  Japan.

*Primary Examiner*—Lien Tran
*Attorney, Agent, or Firm*—Sughrue, Mion, Zinn, Macpeak & Seas, PLLC

[57] ABSTRACT

A steamed wheat flour for use in the fried good to be reheated in an microwave oven contains starch not substantially converted into alpha starch, and has a gluten vitality of 0.80 to 0.92 based on that of untreated wheat flour and a gluten swelling power of 1.05 to 1.55 based on that of untreated wheat flour. A process for producing steamed wheat flour for fry-cooking, which comprises steaming wheat flour in a closed type high-speed agitator under pressure with saturated steam and under conditions of a residence time of 2–20 sec and a product temperature higher than 80° C. but not higher than 92° C.

4 Claims, No Drawings

STEAMED WHEAT FLOUR FOR FRY-COOKING WHICH IS SUITABLE FOR USE IN REHEATING IN A MICROWAVE OVEN AND PRODUCTION PROCESS THEREOF

BACKGROUND OF THE INVENTION

1. Field of the Invention

This invention relates to steamed wheat flour for fry-cooking which is suitable for use in the coating of fried goods such as "tempura" and brings about an improvement in the eating quality of the coating by reheating in a microwave oven when the fried goods using it gets cold; and production process thereof.

2. Description of the Related Art

The coating of the fried goods such as "tempura" is desired to be brittle and crispy. With a view to obtaining such eating quality, it is the common practice to minimize the formation of gluten in the coating liquid for fry-cooking, for example, by 1) using wheat flour which contains protein as less as possible, 2) using cold water or ice water, 3) stirring water and wheat flour roughly with broad chopsticks to an extent that the undissolved lumps of flour still remain in the mixture, 4) cooling the resultant coating liquid and making full use of it in a short time, or 5) using protease.

Such conventional methods however do not bring about sufficient controlling effects for the formation of gluten and it is the present situation that the coating with satisfactory eating quality cannot be obtained. In particular, the fried good obtained by the conventional method shows marked deterioration in its eating quality when it gets cold, and even by reheating in a microwave oven, it inevitably becomes glutinous and sticky without brittleness.

SUMMARY OF THE INVENTION

With a view to obtaining fried coating having more crispy eating quality in consideration of such situations, the present inventors have carried out an extensive investigation. As a result, it has been found that an excellent improvement can be obtained by using, for fry-cooking, wheat flour which has been thermally modified to a predetermined state to a slight degree and in particular, a drastic improvement in the eating quality of the coating can be attained by reheating the fried good, which has been fried using such wheat flour, in a microwave oven, leading to the completion of the present invention.

In one aspect of the present invention, there is thus provided steamed wheat flour suited for use in the fried good to be reheated in a microwave oven, said wheat flour containing starch which has not substantially been converted into alpha starch, and having a gluten vitality of 0.80 to 0.92 based on that of untreated wheat flour and a gluten swelling power of 1.05 to 1.55 based on that of untreated wheat flour. In another aspect of the present invention, there is also provided a process for producing steamed wheat flour suited for use in the fried good to be reheated in a microwave oven, which comprises introducing wheat flour in a closed type agitator which is under pressure with saturated steam being introduced, and carrying out steaming treatment under the conditions of a residence time of 2–20 sec in the closed type agitator so that the product temperature of the wheat flour becomes higher than 80° C. but not higher than 92° C. at the time of discharge from the agitator.

The present invention makes it possible to provide fried coating which is fully swollen and is neither wet nor sticky and has brittle eating quality, and at the same time is almost free from the deterioration of the eating quality even if it gets cold. In particular, the present invention brings about a drastic improvement in the eating quality of the coating by reheating it in a microwave oven.

DETAILED DESCRIPTION OF THE PREFERRED EMBODIMENTS

As wheat flour before steaming treatment (untreated wheat flour) in the present invention, soft wheat flour can be given as a suitable material.

The starch contained in the steamed wheat flour for fry-cooking according to the first aspect of the present invention has not substantially been converted into α-starch and its conversion ratio is much the same with that of the untreated wheat flour and is about 4.5–7.0% as measured by the β-amylase pullulanase method.

In the first aspect of the present invention, the gluten vitality of steamed wheat flour is 0.80–0.92, preferably at least 0.80 but lower than 0.90 based on that of the untreated wheat flour. For example, when the gluten vitality of the untreated wheat flour is 62.6%, that of the steamed one is 50.1–57.6%, preferably 50.1–56.3%. When the gluten vitality of the steamed wheat flour is less than 0.80, the coating made therefrom has tough eating quality and does not have bloomed appearance. Furthermore, the eating quality of the coating after reheated in a microwave oven is not improved. When the gluten vitality of the steamed wheat flour is not lower than 0.92, in particular, higher than 0.92 but not higher than 0.98, on the other hand, the coating made therefrom has crispy eating quality and has bloomed appearance but the eating quality of the coating after reheated in a microwave oven is not improved. When the gluten vitality exceeds 0.98, the coating has tough and glutinous mouthfeel, lacks crispness, is not fully swollen and becomes wet and besides, the eating quality of the coating after reheated in a microwave oven is not improved.

Incidentally, the gluten vitality in the present invention is determined in the following manner.

(1) Upon determination of gluten vitality, soluble protein content is first determined. The determination of the soluble protein content is carried out as follows:

(1-1) About 2 g of a sample (wheat flour) are precisely weighed into a 100 ml volume beaker.

(1-2) 40 ml of 0.05N acetic acid are added to the beaker and stirred using a stirrer at room temperature for 60 min. to prepare a suspension.

(1-3) The suspension is placed into a centrifuge tube and centrifuged at 5000 rpm for 5 min. and then filtered through a filter paper to recover the filtrate.

(1-4) The beaker as used above is washed with 40 ml of 0.05 N acetic acid. The washings are placed into a centrifuge tube and centrifuged at 5000 rpm for 5 min., followed by filtration through a filter paper to recover the filtrate.

(1-5) The filtrates recovered in the above steps (1-3) and (1-4) are combined to make up to 100 ml.

(1-6) 25 ml of the liquid prepared in the above step (1-5) are placed into a Kjeldahl tube in the Kjeltec Autosystem manufactured by Tecator Co., Ltd. (Sweden) using a whole pipette, and then one tablet of the decomposition-promoting agent (composed of potassium sulfate and copper sulfate at a ratio of 9:1) and 15 ml of conc. sulfuric acid are added.

(1-7) Using a Kjeltec decomposition furnace (DIGESTION SYSTEM 20 1015 type) incorporated in the above Kjeltec Autosystem, decomposition is carried out with dial 4 for one hour and then automatized with dial 9 or 10 for one hour.

(1-8) The decomposed liquid is continuously and automatically distilled and titrated using the Kjeltec Distillation and Titration System (KJELTEC AUTO 1030 type) incorporated in the same Kjeltec Autosystem. Incidentally, titration is carried out using 0.1N sulfuric acid.

(1-9) A soluble protein content is calculated in accordance with the following equation:

Soluble crude protein content (%) =

$$0.14 \times (T-B) \times F \times N \times \frac{100}{S} \times \frac{1}{25}$$

wherein:

T: amount (ml) of 0.1N sulfuric acid required for titration,
B: amount (ml) of 0.1N sulfuric acid required for blank titration,
F: titer of 0.1N sulfuric acid used for titration (as determined on use or a commercially available product with titer indication may be used),
N: conversion factor for nitrogen protein (5.70), and
S: weighed amount of sample.

(2) Next, crude protein content is determined.

(2-1) About 0.5 g of a sample (wheat flour) is precisely weighed into a Kjeldahl tube in the Kjeltec Autosystem manufactured by Tecator Co., Ltd. (Sweden), followed by the addition of one tablet of a decomposition-promoting agent ("Kafcut C5", trade name; product of Nisshin Seifun Co., Ltd.; composed of potassium sulfate and copper sulfate at a ratio of 9:1) and 15 ml of conc. sulfuric acid.

(2-2) Using a Kjeltec decomposition furnace (DIGESTION SYSTEM 20 1015 type) in the Kjeltec Autosystem, decomposition is carried out with dial 9 or 10 for one hour.

(2-3) The decomposed liquid is distilled and titrated using a Kjeltec Distillation and Titration system (KJELTEC AUTO 1030 type). The steps of (2-2) and (2-3) are continuously and automatically carried out. Incidentally, titration is carried out using 0.1N sulfuric acid.

(2-4) The crude protein content is determined in accordance with the following equation.

$$\text{Crude protein content (\%)} = \frac{0.14 \times T \times F \times N}{S} \times 100$$

wherein:

T: amount (ml) of 0.1N sulfuric acid required for titration,
F: titer of 0.1N sulfuric acid used for titration (as determined on use),
N: conversion factor for nitrogen protein (5.70), and
S: weighed amount of sample.

(3) The gluten vitality is calculated in accordance with the following equation.

$$\text{Gluten vitality (\%)} = \frac{\text{Soluble protein content}}{\text{Crude protein content}} \times 100$$

In the first aspect of the present invention, the gluten swelling power of the steamed wheat flour is 1.05–1.55, preferably 1.10–1.45, more preferably 1.20–1.35 based on that of the untreated wheat flour. For example, if the gluten swelling power of the untreated wheat flour is 1.8 times, that of the steamed one is 1.9–2.8 times, preferably 2.0–2.6 times, more preferably 2.2–2.4 times. When the gluten swelling power of the steamed wheat flour is less than 1.05 based on that of the untreated wheat flour, the coating made from the steamed wheat flour has tough and glutinous mouthfeel and at the same time, is not fully swollen and becomes wet without crispness after frying. Furthermore, the eating quality of the fried coating after reheated in a microwave oven is not improved. When the gluten swelling power of the steamed wheat flour exceeds 1.55 based on that of the untreated wheat flour, on the other hand, the coating made from the steamed wheat flour has very tough mouthfeel without brittleness. Furthermore, the eating quality of the coating after reheated in a microwave oven is not improved.

Incidentally, the gluten swelling power in the present invention is determined as follows:

(1) About 10 g of a sample (wheat flour) are precisely weighed into a 300 ml volume beaker.
(2) 200 ml of 0.02N lactic acid are added to the above beaker. After stirred with a glass rod, the resulting suspension is allowed to stand overnight.
(3) The suspension prepared in the above is centrifuged at 3000 rpm for 10 minutes.
(4) The supernatant is discarded and the weight (g) of the solid matter sedimented at the bottom is measured.
(5) The gluten swelling power is calculated according to the following equation.

$$\text{Gluten swelling power (times)} = \frac{\text{Weight of solid content (g)}}{\text{Weight of sample (wheat flour) (g)}}$$

The above-described steamed wheat flour for fry-cooking according to the first aspect of the present invention can be produced effectively by the steaming treatment method relating to the second aspect of the present invention. When the treatment conditions are looser than those according to the second aspect of the invention, there sometimes happens a case where the eating quality of the fried coating after reheated in a microwave oven does not become good in spite of having improved eating quality immediately after frying or when the fried good gets cold, or a case where the gluten vitality and gluten swelling power become close to those of the untreated wheat flour. When the treatment conditions are severer, on the other hand, the steamed wheat flour produced thereunder has an α-conversion ratio, gluten vitality and gluten swelling power closer to those of the completely steamed wheat flour. Under such looser or severer steaming conditions, therefore, the object of the present invention cannot be attained.

EXAMPLES

The present invention will hereinafter be described more specifically by the following example and tests.

Example 1

Into a closed type high-speed agitator (an apparatus disclosed in Japanese Patent Kokai 3-83567) which had been pressurized (to absolute pressure of 1.2 kg force/cm$^2$) by blowing saturated steam at a rate of 12 kg/hr, was charged soft wheat flour at a rate of 200 kg/hr. Steaming treatment was performed under the conditions of a peripheral speed of 10.5 m/sec and a residence time of 5 sec to adjust the temperature of the steamed wheat flour at the time of discharge at 85° C. or so, whereby steamed wheat flour for fried goods was produced.

The steamed wheat flour so obtained had an α-conversion ratio of 5.8%, a gluten vitality of 58.5% and a gluten swelling power of 2.8 times. Incidentally, the soft wheat flour prior to steaming treatment had an α-conversion ratio of 4.0%, a gluten vitality of 68.8% and a gluten swelling power of 2.3 times. Accordingly, the gluten vitality of the steamed wheat flour so obtained was 0.85 based on that of the untreated wheat flour, while the gluten swelling power of the steamed wheat flour so obtained was 1.217 based on that of the untreated wheat flour.

A coating liquid was prepared by blending and stirring 100 parts by weight of the steamed wheat flour so obtained, 2 parts by weight of a baking powder and 170 parts by weight of water. The coating liquid was uniformly applied to slices of sweet potato each cut into 1 cm×1 cm×5 cm. The slices were fried in an oil of about 180° C. for 3 minutes to make sweet potato "tempura". The "tempura" so obtained had good bloomed appearance but its coating had rather tough mouthfeel. Such eating quality hardly changed even after the "tempura" got cold.

The fried slices were reheated in a microwave oven after an elapsed time of 2 hours and 4 hours after frying, respectively, which brought about a marked improvement in the eating quality of the coating and the coating became completely brittle and crispy.

Test 1

In a similar manner to Example 1 except that the feed amount of saturated steam and the temperature of the wheat flour were changed as shown in the conditions in Table 1, steamed wheat flour was obtained. The α-conversion ratio, gluten vitality and gluten swelling power of each steamed wheat flour so obtained were determined and the results were as shown in Table 1.

In a similar manner to Example 1, sweet potato "tempura" was prepared using each steamed wheat flour. Concerning the "tempura", appearance and eating quality immediately after frying, eating quality after a predetermined time and eating quality after reheating in a microwave oven were rated by 10 panelists in accordance with the rating standard as defined in the following Table 3. The averaged scores are shown in the following Table 2. Incidentally, determination results of untreated wheat flour and sweet potato "tempura" obtained using it are shown in Table 1 and Table 2 as control.

TABLE 1

| Sample | 1 | 2 | 3 (Ex. 1) | 4 | 5 | Control (untreated wheat flour) |
|---|---|---|---|---|---|---|
| Steaming conditions | | | | | | |
| Steam feed (kg/h) | 8 | 10 | 12 | 14.5 | 16 | |
| Peripheral speed (m/sec) | 10.5 | 10.5 | 10.5 | 10.5 | 10.5 | |
| Steaming time (sec) | 5 | 5 | 5 | 5 | 5 | |
| Wheat flour temperature at the time of discharge (°C.) | 75 | 80 | 85 | 92 | 95 | |
| Quality of steamed wheat flour | | | | | | |
| Gluten vitality (%) | 65.0 | 63.3 | 58.5 | 57.1 | 54.4 | 68.8 |
| (ratio to control) | (94.5) | (92.0) | (85.0) | (83.0) | (79.1) | (100) |
| Conversion ratio to alpha starch (%) | 4.2 | 4.9 | 6.2 | 7.1 | 10.7 | 4.0 |
| Gluten swelling power (times) | 2.5 | 2.7 | 2.8 | 2.8 | 2.9 | 2.3 |
| (ratio to control) | (108.7) | (117.4) | (121.7) | (121.7) | (126.1) | (100) |

TABLE 2

| Sample | 1 | 2 | 3 (Ex. 1) | 4 | 5 | Control (untreated wheat flour) |
|---|---|---|---|---|---|---|
| Coating immediately after frying | | | | | | |
| Appearance | 4.8 | 3.6 | 3.2 | 2.7 | 2.2 | 2.8 |
| Eating quality | 4.5 | 3.8 | 3.4 | 3.2 | 2.3 | 1.2 |
| Coating 2 hours after left at normal tempetature | | | | | | |
| Eating quality | 3.5 | 3.5 | 3.4 | 3.1 | 2.3 | 1.1 |
| Eating quality after reheated in microwave oven | 3.1 | 3.9 | 4.8 | 4.2 | 3.6 | 1.1 |
| Coating 4 hours after left at normal temperature | | | | | | |
| Eating quality | 2.8 | 3.2 | 3.4 | 3.1 | 2.3 | 1.1 |
| Eating quality after reheated in microwave oven | 2.4 | 3.7 | 4.6 | 4.0 | 3.6 | 1.1 |
| Synthetic rating | C | B | A | B | C | D |

TABLE 3

| Items to be rated | Score | Rating standard |
|---|---|---|
| Appearance | 5 | Very good with very widely bloomed coating |
| | 4 | Considerably good with widely bloomed coating |
| | 3 | Slightly good with normally bloomed coating |
| | 2 | Slightly poor with narrowly bloomed coating |
| | 1 | Inferior without bloomed coating |
| Eating quality | 5 | Completely crispy |
| | 4 | Crispy |
| | 3 | Glutinous and not so brittle |

TABLE 3-continued

| Items to be rated | Score | Rating standard |
|---|---|---|
| | 2 | Tough and not brittle |
| | 1 | Completely elastic and highly glutinous |
| Total (durability with the passage of time and suitability of reheating in a microwave oven) | A | Excellent |
| | B | Good |
| | C | Slightly inferior |
| | D | Inferior |

Test 2

In a similar manner to Example 1 except that another kind of the soft wheat flour was used, and the feed amount of saturated steam, temperature of wheat flour and feed amount of wheat flour were changed as shown in the conditions in Table 4, each steamed wheat flour was obtained. Results of the determination of the α conversion ratio, gluten vitality and gluten swelling power of the steamed wheat flour so obtained and results of the rating of the sweet potato "tempura" performed as in Test 1 were as shown in Tables 4 and 5. Incidentally, determination results and rating results of untreated wheat flour and sweet potato "tempura" obtained using it are also shown as control.

TABLE 4

| | 6 | 7 | 8 | 9 | 10 | 11 | 12 | Control (untreated wheat flour) |
|---|---|---|---|---|---|---|---|---|
| Steaming conditions | | | | | | | | |
| Steam feed (kg/h) | 18 | 24 | 30 | 36 | 42 | 24 | 12 | |
| Peripheral speed (m/sec) | 10.5 | 10.5 | 10.5 | 10.5 | 10.5 | 10.5 | 10.5 | |
| Steaming time (sec) | 5 | 5 | 5 | 5 | 5 | 5 | 5 | |
| Wheat flour temp. at the time of discharge (°C.) | 70 | 75 | 80 | 85 | 92 | 85 | 86 | |
| Wheat flour feed (kg/h) | 600 | 600 | 600 | 600 | 600 | 400 | 200 | |
| Quality of steamed wheat flour | | | | | | | | |
| Gluten vitality (%) | 58.0 | 54.5 | 51.7 | 49.7 | 47.3 | 49.3 | 48.6 | 58.7 |
| (ratio to control) | (98.9) | (92.8) | (88.1) | (84.7) | (80.6) | (84.0) | (82.8) | (100) |
| Conversion to α-starch (%) | 2.8 | 3.8 | 4.4 | 4.7 | 6.8 | 3.5 | 2.9 | 3.2 |
| Gluten swelling power (times) | 2.1 | 2.5 | 2.8 | 2.9 | 2.9 | 2.8 | 2.7 | 1.0 |
| (ratio to control) | (110.5) | (131.6) | (147.4) | (152.6) | (152.6) | (147.4) | (142.1) | (100) |

TABLE 5

| Sample | 6 | 7 | 8 | 9 | 10 | 11 | 12 | Control (untreated wheat flour) |
|---|---|---|---|---|---|---|---|---|
| Coating immediately after frying | | | | | | | | |
| Appearance | 4.5 | 4.7 | 3.7 | 3.2 | 2.8 | 3.3 | 3.4 | 2.7 |
| Eating quality | 4.4 | 4.5 | 3.8 | 3.5 | 3.2 | 3.5 | 3.6 | 1.2 |
| Coating 2 hours after left at normal temperature | | | | | | | | |
| Eating quality | 3.2 | 3.7 | 3.5 | 3.4 | 3.2 | 3.5 | 3.6 | 1.2 |
| Eating quality after reheated in microwave oven | 2.4 | 3.1 | 3.9 | 3.8 | 4.0 | 4.8 | 4.8 | 1.1 |
| Coating 4 hours after left at normal temperature | | | | | | | | |
| Eating quality | 2.4 | 2.9 | 3.2 | 3.3 | 3.0 | 3.4 | 3.5 | 1.1 |
| Eating quality after reheated in microwave oven | 1.9 | 2.3 | 3.8 | 4.6 | 4.0 | 4.6 | 4.7 | 1.1 |
| Synthetic rating | D | C | B | A | B | A | A | D |

What is claimed is:

1. A steamed wheat flour for fry-cooking which is suitable for use in reheating in a microwave oven, said steamed wheat flour comprising the starch not substantially converted into alpha starch, and having a gluten vitality of 0.80 to 0.92 based on that of untreated wheat flour and a gluten swelling power of 1.05 to 1.55 based on that of untreated wheat flour.

2. A steamed wheat flour for fry-cooking according to claim 1, which has a gluten vitality of at least 0.80 but lower than 0.90 based on that of untreated wheat flour.

3. A process for producing steamed wheat flour for fry-cooking which is suitable for use in reheating in a microwave oven, which comprises introducing wheat flour in a closed type agitator which is under pressure with saturated steam being introduced, and carrying out steam treatment under conditions of a residence time of 2–20 sec in the agitator so that temperature of the wheat flour becomes higher than 80° C. but not higher than 92° C. at the time of discharge from the agitator.

4. A steamed wheat flour for fry-cooking according to claim 1, wherein said steamed wheat flour is treated with saturated steam under pressure in a closed type agitator, said steamed wheat flour being treated in said agitator for a residence time of 2–20 sec., said treating resulting in a temperature of the wheat flour becoming greater than 800° C. but not more than 920° C. at the time of discharge of said steamed wheat flour from said agitator.

* * * * *

UNITED STATES PATENT AND TRADEMARK OFFICE
CERTIFICATE OF CORRECTION

PATENT NO. : 5,874,122
DATED : February 23, 1999
INVENTOR(S) : UEKI et al

It is certified that error appears in the above-identified patent and that said Letters Patent is hereby corrected as shown below:

In column 8, line 63, change "800°" to --80°--; and at line 64, change "920°" to --92°--.

Signed and Sealed this

Fifteenth Day of June, 1999

Attest:

Q. TODD DICKINSON

Attesting Officer

Acting Commissioner of Patents and Trademarks